United States Patent [19]

Porter et al.

[11] 4,333,906

[45] Jun. 8, 1982

[54] PROCESS FOR PRODUCING HOLLOW FIBERS HAVING A NON-UNIFORM WALL THICKNESS AND A NON-UNIFORM CROSS-SECTIONAL AREA

[75] Inventors: Christopher H. Porter, Newtown Square; John A. Taylor, Furlong, both of Pa.

[73] Assignee: Extracorporeal Medical Specialties, Inc., King of Prussia, Pa.

[21] Appl. No.: 167,891

[22] Filed: Jul. 14, 1980

Related U.S. Application Data

[62] Division of Ser. No. 19,973, Mar. 12, 1979, Pat. No. 4,288,494.

[51] Int. Cl.³ .............................................. B29C 17/02
[52] U.S. Cl. ..................................... 264/40.3; 264/41; 264/541; 264/167; 264/209.1
[58] Field of Search .................... 264/167, 209.8, 40.3; 425/326.1

[56] References Cited

U.S. PATENT DOCUMENTS

| 3,046,178 | 7/1962 | Tupper | 264/167 |
| 3,312,766 | 4/1967 | Stevens | 264/167 |
| 3,400,189 | 9/1968 | Nacke | 264/167 |
| 3,421,873 | 1/1969 | Burgman et al. | 264/167 |
| 3,674,404 | 7/1972 | Burlis et al. | 425/326.1 |
| 3,712,782 | 1/1973 | Burlis | 425/326.1 |
| 4,138,457 | 2/1979 | Rudd et al. | 264/541 |

FOREIGN PATENT DOCUMENTS

| 1259008 | 1/1968 | Fed. Rep. of Germany | 264/167 |
| 39-29202 | 12/1964 | Japan | 264/167 |
| 40-13012 | 6/1965 | Japan | 264/167 |
| 859325 | 1/1961 | United Kingdom . | |

Primary Examiner—Jay H. Woo

[57] ABSTRACT

Hollow fibers, particularly useful as semipermeable membranes in separatory devices such as blood dialyzers, having a non-uniform cross-sectional area along the length thereof. The fibers have recurring points of maximum outside diameter and minimum outside diameter and such points may recur on a regular basis or at random. Fiber wall thicknesses may be substantially uniform or non-uniform. Methods and apparatus for making the fibers are disclosed.

11 Claims, 10 Drawing Figures

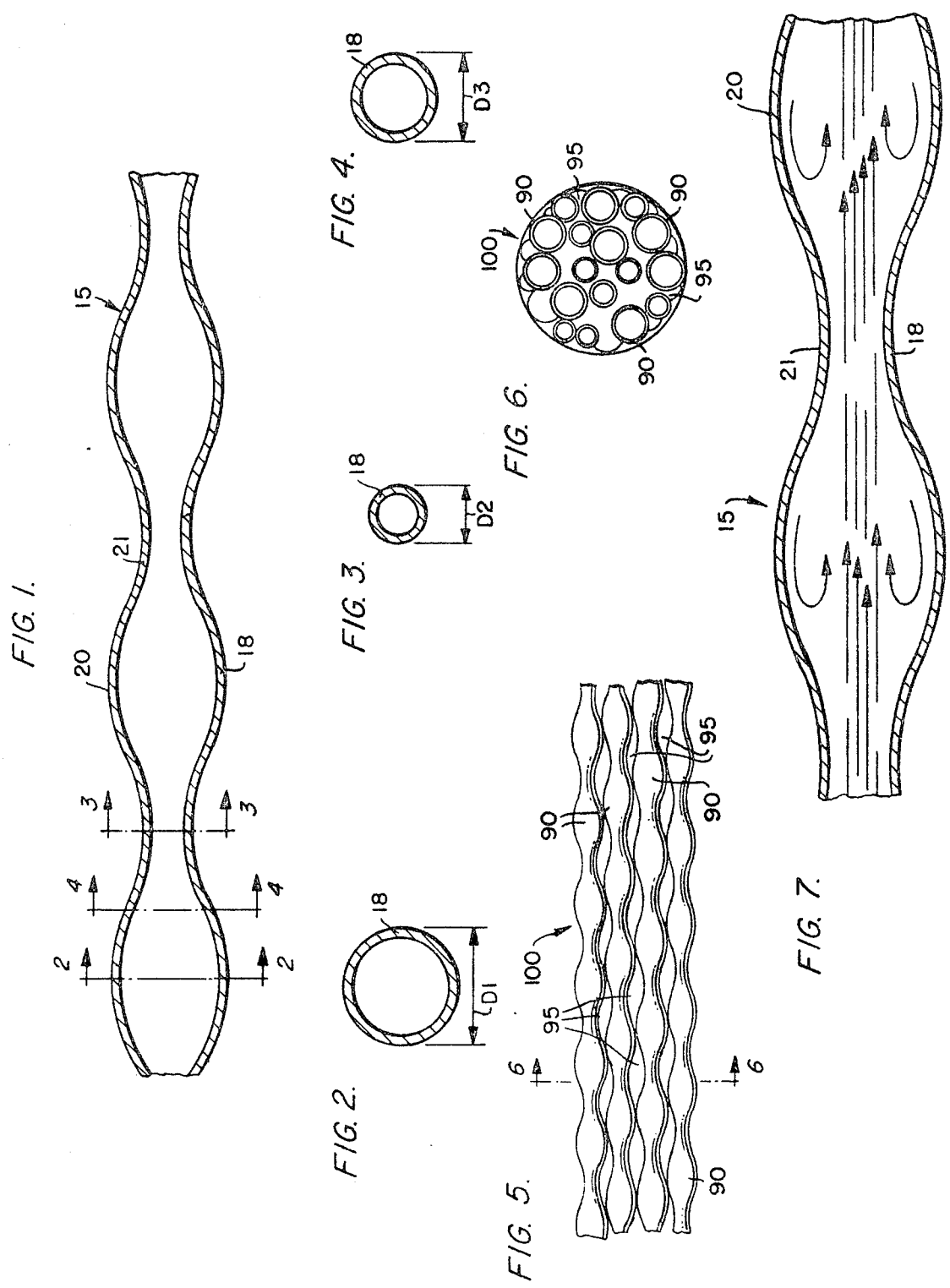

PROCESS FOR PRODUCING HOLLOW FIBERS HAVING A NON-UNIFORM WALL THICKNESS AND A NON-UNIFORM CROSS-SECTIONAL AREA

This is a division, of application Ser. No. 19,973, filed Mar. 12, 1979, now U.S. Pat. No. 4,288,494 issued Sept. 8, 1981.

This invention relates generally to hollow fibers, and particularly to hollow fibers having a non-uniform cross-sectional area, that is, the cross-sectional area of the fibers varies along the length thereof. Even more particularly, the invention relates to cuproammonium cellulose hollow fibers having non-uniform cross-sectional areas and to methods of making the same.

Currently, several types of hollow fibers are used as dialysis membrane in artificial kidney dialyzers. One type of fiber is made of hydrolyzed cellulose acetate. These are made by acetylating cellulose to form the cellulose acetate, a thermoplastic polymer. The cellulose acetate is subsequently extruded, either as a polymer melt or as a solution in a suitable solvent, to form the desired hollow fiber. The cellulose acetate hollow fiber is thereafter subjected to chemical hydrolysis, for example, in the presence of sodium hydroxide, to remove the acetate groups.

Another type of hollow fiber useful in dialysis is made from cellulose acetate. Such fibers are made as described above, but are not subjected to chemical hydrolysis to remove the acetate groups. Cellulose acetate and cellulose triacetate hollow fibers for use in a permeability separatory apparatus are disclosed in U.S. Pat. No. 3,228,877.

Still another type of hollow fiber which has been used in kidney dialysis is made from cuproammonium regenerated cellulose. These fibers, and a method for making them, are disclosed in U.S. Pat. No. 3,888,771.

The prior art hollow fibers heretofore used as dialysis membranes in artificial kidneys are generally circular in cross-section and have a continuous lumen running the length thereof. They have a substantially uniform wall thickness and substantially constant inside and outside diameters. As a result, the cross-sectional area of these fibers is substantially constant.

It is well known that hollow fiber artificial kidneys comprise a bundle of semipermeable hollow fibers which are sealed at the ends thereof into a suitable casing. The ends of the casing containing the hollow fibers are suitably manifolded, one manifold having a blood inlet, the other manifold having a blood outlet. The casing itself has a dialysate inlet and a dialysate outlet. In use, blood to be dialyzed flows internally through the cores of the hollow fibers, while the dialysate flows externally over the outer surfaces of the fibers. Impurities are removed from the blood by dialysis thereof through the walls of the hollow fibers. The impurities are dissolved in the flowing dialysate which carries them out of the dialyzer and the purified blood is returned to the patient's body.

In accordance with the present invention, there are provided hollow fibers which have a non-uniform cross-sectional area, that is, the cross-sectional area of the fibers varies along the longitudinal axis of the fiber. The thickness of the wall of the fiber of the invention may be uniform in both the longitudinal and transverse directions, or it may vary longitudinally, or it may vary transversely, or it may vary both longitudinally and transversely. In general, the fibers of the invention have a circular cross-section but fibers having other cross-sectional configurations, such as oval, can also be made.

The fibers of the invention have several advantages over the prior art fibers heretofore used in artificial kidney dialyzers and the like permeability separatory devices. First of all, these fibers have a lower bulk density than the above described prior art fibers. When these fibers are gathered into a bundle, the resulting bundle has a lower bulk density than does a bundle of prior art fibers. In addition, the bundle of fibers, owing to the non-uniform cross-sectional area of the fibers therein, has a certain degree of compliance and compressibility. Thus, after the hollow fibers of the invention are gathered into a bundle and the bundle of fibers has been compressed and inserted into the casing of a dialyzer or similar permeability separatory device, the fibers of the bundle will tend to expand laterally within the casing, thus producing a well dispersed fiber mass. Channeling of the externally flowing liquid, that is, the tendency of the externally flowing liquid to follow a particular flow path through the permeability separatory device and preferentially wash some fibers to the exclusion of others, is thereby reduced and a more uniform distribution of the externally flowing liquid is thereby promoted. Thus, for example, in a hollow fiber dialyzer, the dialysate is more uniformly distributed and the efficiency of dialysis is increased.

Another advantage of the hollow fibers of the invention is that, when arranged in bundles, adjacent fibers tend to touch each other at a limited number of points along their lengths. The fibers thus act as "flow splitters," that is, the externally flowing liquid, when it reaches the point at which adjacent fibers come into contact with one another, is redirected into another flow pattern. Static mixing is thereby greatly improved as a result of which the concentration gradient (in the case of a mass transfer device) or the temperature gradient (in the case of a heat exchange device) is desirably reduced.

Another, and very important, advantage associated with the non-uniform cross-sectional area hollow fibers of this invention is that mixing of the liquid flowing through the cores of the fibers is improved, thus improving the efficiency of the mass transfer device. Referring specifically to an artificial kidney dialyzer, the rate of blood flow through the hollow fibers is increased in those portions of the fiber which have relatively smaller cross-sectional areas and is decreased in those portions of the fibers which have relatively larger cross-sectional areas. The resulting pattern of acceleration and deacceleration of the blood as it flows through the fibers set up secondary flows in those portions of the fibers having the relatively larger cross-sectional areas; these secondary flow patterns, in turn, tend to bring a fresh supply of blood to the internal surface of the fiber wall.

Fibers of the present invention are made with apparatus which includes a spinneret of the tube-in-orifice type. Such spinnerets are known in the art and have an inner chamber communicating with the outside of the spinneret housing. A hollow tube is secured within the aforementioned inner chamber. A fiber-forming material is supplied to the annular space defined by the outer surface of the tube and the wall of the inner chamber. Usually a fluid is supplied to the lumen of the hollow tube.

Hollow fibers having a non-uniform cross-sectional area and a non-uniform wall thickness are made by a process which includes the steps of supplying a fiber forming material to the chamber of the spinneret, extruding the fiber forming material through the annular space of the spinneret to form a hollow core extrudate, supplying a fluid at a constant mean flow rate to the lumen of the hollow tube of the spinneret while periodically varying the pressure on said supplied fluid, removing from the exit of the spinneret an extrudate containing the fluid in the hollow core thereof, and converting the fiber forming material to fiber form.

Hollow fibers having a non-uniform cross-sectional area and a uniform wall thickness are made by a process similar to that described immediately above, except that the fiber forming material is supplied to the spinneret at a constant mean flow rate while periodically varying the pressure thereon.

BRIEF DESCRIPTION OF THE DRAWING

The invention will be better understood with reference to the appended drawings in which:

FIG. 1 is an enlarged longitudinal sectional view of one embodiment of a hollow fiber in accordance with the present invention;

FIG. 2 is a cross-sectional view taken along line 2—2 of FIG. 1;

FIG. 3 is a cross-sectional view taken along line 3—3 of FIG. 1;

FIG. 4 is a cross-sectional view taken along line 4—4 of FIG. 1;

FIG. 5 is a greatly enlarged view of a bundle of the hollow fibers of FIG. 1, the bundle having empty spaces between the fibers;

FIG. 6 is a cross-sectional view taken along line 6—6 of FIG. 5;

FIG. 7 is a greatly enlarged longitudinal sectional view of the hollow fiber of FIG. 1 showing the secondary flow patterns set up within the fiber as a consequence of the non-uniform cross-sectional area of the fiber;

DETAILED DESCRIPTION OF THE INVENTION

Figure 8:
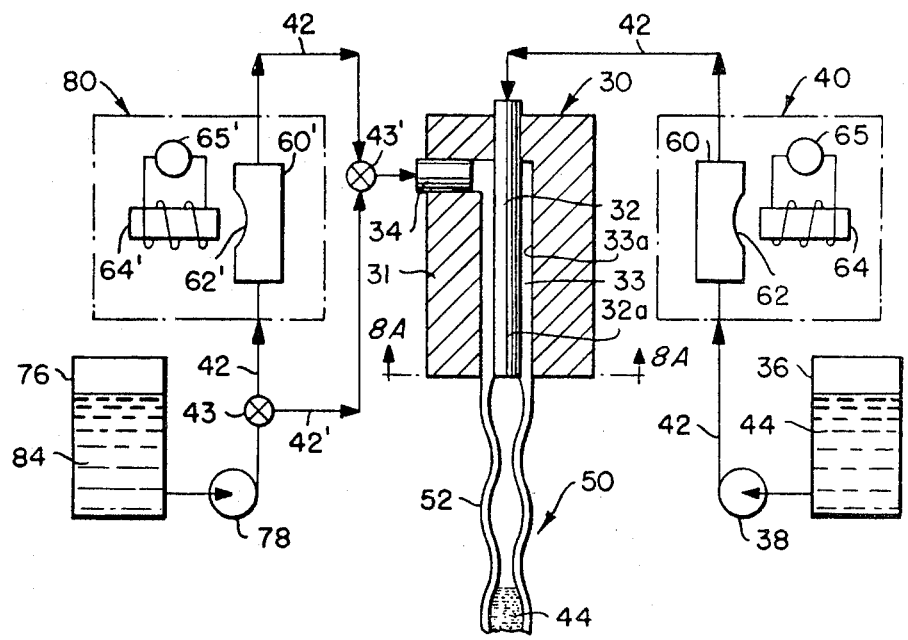
FIG. 8 is a schematic view, with certain parts shown in section, of an apparatus for making the hollow fibers of the invention.
Figure 8A:
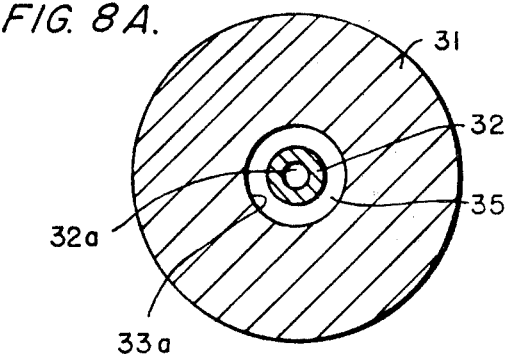
FIG. 8A is a cross-section taken along line 8A—8A of FIG. 8.

Referring now to FIGS. 1-4 of the drawing, there is shown a generally circular hollow fiber 15 having a non-uniform cross-sectional area along its longitudinal axis, represented by dashed line 16. In this particular embodiment, the thickness of the wall 18 of the fiber is generally constant both longitudinally, that is, as seen in FIG. 1, and transversely, that is, as seen in FIGS. 2, 3 and 4. As illustrated in FIG. 2, fiber 15 has a maximum outside diameter, $D_1$, and, as illustrated in FIG. 3, a minimum outside diameter, $D_2$. As illustrated in FIG. 4, the fiber has an intermediate outside diameter, $D_3$. The cross-sectional area, $CA_1$, of fiber 15 at line 2—2 of FIG. 1 is equal to $(D_1)^2(\pi/4)$. The cross-sectional area, $CA_2$, of the fiber at line 3—3 of FIG. 1 is equal to $(D_2)^2(\pi/4)$, while the cross-sectional area, $CA_3$, of the fiber at line 4—4 of FIG. 1 is equal to $(D_3)^2(\pi/4)$. Cross-sectional area $CA_1$ is larger than cross-sectional area $CA_2$. Cross-sectional area $CA_3$ of fiber 15 is smaller than $CA_1$ and larger than $CA_2$. Thus, in the hollow fiber of the invention, the cross-sectional area of the fiber is non-uniform, that is, it changes or varies, along its length. In traveling along the length of the fiber in the left to right direction in FIG. 1, the cross-sectional area of the fiber has its maximum at line 2—2, is smaller at line 4—4, and has its minimum at line 3—3. Continuing toward the right, the cross-sectional area increases until it again reaches its maximum at point 20, after which, still continuing to the right, the cross-sectional area decreases until it reaches its minimum again at point 21. This variation in the cross-sectional area continues throughout the length of the fiber. The number of times in which points of maximum cross-sectional area and points of minimum cross-sectional area occur in a unit length of the fiber may be changed by making suitable adjustments in the manufacturing processes to be described hereinafter.

The hollow fibers of the present invention can be made from a variety of fiber forming polymers including the thermoplastic, fiber forming cellulose esters, such as cellulose acetate and cellulose triacetate, which, if desired, may be subsequently hydrolyzed to remove the ester groups. The hollow fibers may also be made from viscose regenerated cellulose or cuproammonium regenerated cellulose, the latter being particularly desirable. Other fiber forming polymers such as, for example, polyamides, polyesters, polycarbonates, polyacrylonitrile or polyacrylonitrile copolymers, high density polyethylene, polypropylene and polyvinyl alcohol, may also be used.

The term "fiber forming material" as used herein includes a polymer melt or a polymer solution. For example, nonuniform cross-sectional area hollow fibers of cellulose acetate, a thermoplastic polymer, may be formed by a process which includes extruding cellulose acetate in melt form through the orifice of a suitable tube-in-orifice spinneret, optionally stretching the extrudate, and allowing the extruded hollow fiber to solidify into its final form. As another example, it is possible to use a process which includes the step of extruding a solution of the desired polymer in a solvent through the orifice of a tube-in-orifice spinneret. In such a process, the solvent, if it is sufficiently volatile, may be evaporated from the extruded polymer solution to produce the fiber in its final form. If a less volatile solvent is used to dissolve the polymer, then the extruded polymer solution may be passed through a bath containing a material which will leach out the solvent used for the polymer solution but which will not dissolve the polymer material. In this case, the solvent will be extracted from the polymer solution, and the polymer will be precipitated in its desired hollow fiber configuration.

Cuproammonium cellulose solution or viscose solution may be used to form, respectively, hollow fibers of cuproammonium regenerated cellulose or viscose. Cuproammonium regenerated cellulose hollow fibers, for example, may be made by extruding a cuproammonium cellulose solution through the orifice of a tube-in-orifice spinneret. After exiting the spinneret, the outside diameter of the extruded cuproammonium solution may be reduced by, for example, allowing the extrudate to fall freely through an open space for a predetermined distance. The extrudate is then coagulated, regenerated, rinsed and dried before being wound up in final form.

It will be understood by those skilled in the art that in the process of forming hollow fibers, the fiber forming material is extruded through the annular orifice of a tube-in-orifice spinneret. Depending on the dimensions of the spinneret and depending also on the fiber forming material being used, it may or may not be necessary to supply a material to the tube of the tube-in-orifice spinneret. For example, when a thermoplastic polymer like cellulose acetate is used in melt form as the fiber forming material, it may not be necessary to supply any material to the tube. In other cases, for example where it is desired to make hollow fibers from cuproammonium solution or viscose solution, it may be necessary to supply a material in liquid or gaseous form to the tube of the tube-in-orifice spinneret. When this is done, the core of the extruded fiber forming material contains the liquid or gas which in turn prevents collapse of the hollow fiber structure. Gas, e.g., air or nitrogen, supplied under appropriate pressure, will prevent collapse of the extruded material; a liquid will likewise prevent undesired collapse.

In the case of cuproammonium cellulose solution, the liquid supplied to the core of the extrudate may be removed at any time after the extruded cuproammonium cellulose has been regenerated to produce the fiber.

A tube-in-orifice spinneret useful for producing fibers in accordance with the invention is disclosed in U.S. Pat. No. 3,888,771. The extrusion apparatus disclosed in British Pat. No. 534,618 may also be used.

As indicated earlier herein, the non-uniform cross-sectional area fibers of the present invention are produced by a process which includes (i) the step of supplying the fiber forming material to the annular orifice of the spinneret at a constant mean flow rate while varying the pressure thereon; or (ii) the step of supplying a core material to the hollow tube of the tube-in-orifice spinneret at a constant mean flow rate while varying the pressure applied thereto; or (iii) the step of supplying both the fiber forming material and the core material to the spinneret at a constant mean flow rate while varying the pressure applied to each of said materials.

Referring to FIG. 8, there is illustrated apparatus 28 for making hollow fibers according to the present invention. Spinneret 30 comprises a housing 31 having a circular chamber 33 defined by interior wall 33a. One end of chamber 33 communicates with the outer bottom surface of the spinneret, while its other end communicates with inlet 34 in the side of the housing. Circular tube 32 has a lumen 32a extending the length thereof and is concentrically fixed within chamber 33. One end of tube 32 communicates with the outer bottom surface of the spinneret, while the other end conveniently projects somewhat beyond the top surface of the spinneret. The outer surface of tube 32 cooperates with interior wall 33a to define an annular space 35 through which fiber forming material is extruded. A core fluid, either a liquid or a gas, may be passed through lumen 32a of tube 32.

Apparatus 28 further comprises a first reservoir 36, a first pump means 38, and means 40 for varying the pressure of the core fluid being supplied to the interior of hollow tube 32. Reservoir 36, pump means 38, and fluid pressure varying means 40 are connected as illustrated in FIG. 8 by suitable conduit material 42. A supply of core fluid 44 is held in reservoir 36. From there, fluid 44 passes through pump means 38, thence through fluid pressure-varying means 40, and finally into the interior of tube 32.

Apparatus 28 also comprises a second reservoir 76, a second pump means 78, and means 80 for varying the pressure of the fiber forming material being supplied through inlet 34 to chamber 33 of the spinneret. Reservoir 76, which holds fiber forming material 84, pump means 78, and pressure varying means 80 are connected as illustrated at the left hand side of FIG. 8 by conduit means 42. It will be noticed that apparatus 28 has a pair of two-way valves 43, 43' one on the upstream side of means 80, the other on the downstream side. These are connected by conduit means 42'. Thus, depending on the setting of the two-way valves, fiber forming material 84 can be pumped either through pressure varying means 80 or it may bypass means 80 and be pumped directly to inlet 34 of the spinneret.

The extrudate 50 exiting spinneret 30 comprises a wall 52 of fiber forming material 84 surrounding core fluid 44 (illustrated by stippling in the lower central portion of FIG. 8). The extrudate, after solidifying (in the case the fiber forming material is a polymer melt) or after removal of solvent (in the case where the fiber forming material is a polymer solution) or after coagulation and regeneration (in the case where the fiber forming material is cuproammonium cellulose solution or viscose solution) has the non-uniform cross-sectional area structure described earlier herein in connection with FIGS. 1-4. If the core fluid is a gas such as air, then it need not be removed from the interior of the fiber. If the core fluid is a liquid, such liquid can be removed at any time after the desired fiber has been formed.

The non-uniform cross-sectional area of the fiber of the invention is produced by the action of pressure varying means 40 on the core fluid 44. The outer diameter of the extrudate is varied by varying the pressure of the core fluid. The higher the pressure of the core fluid at the exit of spinneret 30, the larger will be the outside diameter of extrudate 50 at that point. Lower pressure gives correspondingly smaller outer diameters. Thus, varying the pressure on the core fluid supplied to annular space 35 produces an extrudate 50, and ultimately a hollow fiber, having a non-uniform cross-sectional area.

Means 40 for varying the pressure on core fluid 44 may take several different forms. As illustrated in FIG. 8, core fluid pressure varying means 40 comprises an enclosed oscillatory chamber 60 having an inlet and outlet and defined at least in part by a flexible diaphragm 62. The pressure in chamber 60 is controlled by electromagnetic coil 64 acting on diaphragm 62. Coil 64 is driven by an electronic oscillator 65, similar to an audio oscillator. Oscillator 65 is such that the wave form, wave amplitude, and wave frequency of the electrical energy supplied to coil 64 can be varied. Various wave forms, e.g., sine, triangular or random, can be employed. Thus, in use, the electrical energy supplied by electronic oscillator 65 is transmitted through electromagnetic coil 64 to diaphragm 62. The diaphragm, responsive to the energy supplied to it by the oscillator and coil, alternately compresses and rarifies core fluid 44 flowing through chamber 60. The motion of the diaphragm varies the pressure on the core fluid, thus producing an alternating pressure at the exit of spinneret 30. This, in turn, produces the variation in cross-sectional area of the extrudate 50.

EXAMPLE I

A cuproammonium regenerated cellulose hollow fiber having a non-uniform wall thickness and a non-uniform cross-sectional area is made using apparatus 28 shown in FIG. 8. Tube 32 of the spinneret has an outside diameter of 0.040 inch and an inside diameter of 0.015 inch. The outer diameter of annular orifice 35 at the exit of the spinneret is 0.190 inch, i.e., the distance between the outer surface of tube 32 and inner wall 33a is 0.075 inch.

The core fluid, i.e., the material to be supplied to lumen 32a of hollow tube 32 and which will be contained in the hollow core of extrudate 50 exiting the spinneret, is isopropyl myristate, a supply of which is stored in reservoir 36.

Pump 38 is a non-pulsatile, positive displacement metering pump which is capable of supplying the isopropyl myristate core liquid at a selected constant mean flow rate to oscillatory chamber 60. Diaphragm 62 is a sheet of polyester film, 3 mils thick. Electronic oscillator 65 has a triangular wave output with power amplifier for driving the external electromagnetic coil 64 at approximately 8 watts with adjustable output amplitude. The electronic oscillator is set to operate at 750 cycles per minute.

The fiber forming material is a conventional cuproammonium cellulose solution containing 8.5% by weight cellulose (purified cotton linters), 3.5% by weight copper (as $Cu^{++}$) and 18.2% by weight ammonium ($NH_4^+$). The viscosity of the cuproammonium cellulose may conveniently range from about 25000 to 55000 centipoises at 25° C. and its specific gravity is 1.3 at 25° C. A supply of the cuproammonium cellulose solution is held in reservoir 76. Valves 43, 43' are set so that the cuproammonium cellulose solution bypasses oscillatory chamber 80, that is, the cuproammonium cellulose solution is pumped by non-pulsatile, positive displacement metering pump 78 through by-pass conduit 42' to inlet 34 of spinneret 30.

The lines connecting reservoir 36, pump 38, oscillatory chamber 44 and the inside of hollow tube 32 are purged with the isopropyl myristate core material. The lines connecting reservoir 76, pump 78 and inlet 34 are purged with the cuproammonium cellulose solution.

To produce the desired cuproammonium hollow fiber, the aforementioned cuproammonium cellulose solution is supplied to spinneret 30 at a rate of about 6 grams (4.6 ml) per minute. As can be seen in FIG. 8, the cuproammonium cellulose solution first flows through inlet 34, then through annular space 35 defined by the outer surface of tube 32 and the walls of chamber 33, after which it leaves the spinneret exit as extrudate 50.

As the cuproammonium cellulose solution is being supplied to inlet 34 of spinneret 30, the isopropyl myristate core liquid is supplied to the lumen of hollow tube 32 at a constant mean flow rate of about 3.2 grams/minute. The core liquid enters the hollow tube at the top of the spinneret and leaves at the bottom. The pressure on the core liquid is uniformly varied by the compressing and rarifying action of diaphragm 62 responding to the action of electromagnetic coil 64 which is driven by oscillator 65 operating at 750 cycles/minutes. As the core liquid leaves the spinneret, it is enclosed in the hollow core of the extruded cuproammonium cellulose solution. The mean pressure applied to the system depends on several factors such as, for example, the dimensions of the tube of the spinneret and the dimensions of oscillatory chamber. In general, the instantaneous pressure on the core liquid ranges from a peak value of about three times the mean pressure to a minimum value of about one-third of the mean pressure.

The extrudate 50 is allowed to fall through an open space of about 11 cm. into a coagulation bath of 15% NaOH. This distance may be varied in order to control the outer diameter of the final fiber. Sodium hydroxide coagulation baths are well known in the cuproammonium cellulose fiber art; it is also well known that the concentration of sodium hydroxide may be varied if desired. The coagulated extrudate is led from the coagulating bath into a regenerating bath, after which it is rinsed; plasticized or otherwise treated, if desired; dried; and collected on a suitable collection device. The regenerating bath is 3% by weight aqueous sulfuric acid. The coagulated and regenerated fiber is rinsed in a water bath, dried at 110° C., and collected. It will be recognized by those skilled in the art that other coagulating and regenerating baths well known in the art may be used in place of the sodium hydroxide coagulating bath and the sulfuric acid regenerating bath employed in this Example I.

Figure 9:
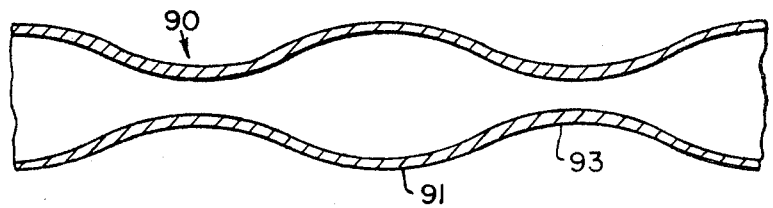
FIG. 9 is an enlarged longitudinal sectional view of another embodiment of a hollow fiber in accordance with the present invention.

The resulting fiber 90 is illustrated in longitudinal section in FIG. 9. The fiber has a maximum outside diameter at point 91 of about 240 microns. The wall thickness at the point of maximum outside diameter is about 9 microns. The fiber has a minor diameter at point 93 of about 175 microns. The wall thickness at the point of minor diameter is about 13 microns. The number of points of maximum outside diameter in fiber 90 may range from about one/meter to about two hundred/meter, and preferably from about five/meter to about fifty/meter. In fiber 90, which is made by regularly varying the pressure applied to the core liquid, the number of points of minimum outside diameter would correspond to the number of points of maximum outside diameter. Thus the total number of points of maximum outside diameter and minimum outside diameter may range from about 2/meter to about 400/meter, and preferably from about 10/meter to about 100/meter. The fiber wall thickness is greatest at the point of minimum fiber diameter and smallest at the point of maximum fiber diameter. Fiber 90 is semipermeable and is useful in a variety of permeability separatory devices. In particular, it is useful as a semipermeable hollow fiber membrane for artificial kidney dialyzers.

FIG. 6 illustrates a bundle 100 of hollow fibers 90 as same might appear when included in a blood dialyzer. Void spaces 95 are present between the fibers, such void spaces acting as the "flow-splitters" referred to hereinabove.

In the method of this Example I, the pressure applied to the core liquid varies on a regular basis, i.e., the peak and minimum pressure values recur at fixed or uniform time intervals. This regularity results in a hollow fiber 90 which has the following characteristics: (a) the spacing between any point 91 of maximum outside diameter and the next adjacent point of maximum outside diameter is substantially constant along the length of the fiber; (b) the spacing between any point 93 of minimum outside diameter and the next adjacent point of minimum outside diameter is substantially constant along the length of the fiber; and (c) the spacing between any point of maximum outside diameter and the next adjacent point of minimum outside diameter is substantially constant along the length of the fiber. In other words, the points of major outside diameter and the points of minimum outside diameter have constant repeat distances.

It will be recognized, however, that the pressure applied to the core fluid may also be varied on a random basis, i.e., the peak and minimum pressures may recur at non-fixed or non-uniform time intervals. In such a case, the points of maximum and minimum outside diameters will occur at random along the length of the fiber, that is, the points of maximum outside diameter and the points of minimum outside diameter will have random repeat distances. The total number of points of maximum outside diameter and minimum outside diameter may range up to four hundred/meter or even more. Hollow fibers having such randomly occurring points of maximum and minimum outside diameters are particularly useful as hollow fiber membranes in blood dialyzers and other semipermeable separatory devices because, in addition to having the "flow-splitting" characteristics mentioned earlier herein, interdigitation of the bundled fibers is greatly reduced and undesirable channeling affects are minimized.

It will be understood that the spacings referred to above can be changed by changing the frequency with which the pressure in the core fluid is varied. The higher the frequency at which the pressure is varied, the closer will be the spacing between a point of maximum diameter and a point of minimum diameter. Similarly, reducing the frequency at which the pressure on the core fluid is varied will reduce such spacing.

EXAMPLE II

A cuproammonium regenerated cellulose hollow fiber having a substantially uniform wall thickness and a non-uniform cross-sectional area is made using the apparatus of FIG. 8. In this case, however, the two way valves 43, 43' are set so that the cuproammonium cellulose solution is pumped first through means 80 for varying the pressure applied to said solution and then to inlet 34 of the spinneret.

Means 80 for varying the pressure applied to the fiber forming material corresponds generally to means 40 for varying the pressure applied to the core fluid. Thus, means 80 comprises an oscillatory chamber 60' having a flexible diaphragm 62', an electromagnetic coil 64' which acts on the diaphragm and an electronic oscillator 65'.

The core liquid is isopropyl myristate and the fiber forming material is the same cuproammonium cellulose solution described in Example I above.

The process of this Example II is similar to that of Example I except the Example II process includes the additional step of uniformly varying the pressure on the cuproammonium cellulose solution. Thus, in order to produce a hollow fiber having a substantially uniform wall thickness and a non-uniform cross-sectional area, it is necessary to (1) supply the core liquid at a constant mean flow rate and under a varying pressure to the lumen of hollow tube 32 of the spinneret, and (2) supply the cuproammonium cellulose solution at a constant mean flow rate and under a varying pressure to the inlet 34 of the spinneret from whence it flows through, and out of, the annular orifice 35 of the spinneret. The pressure applied to the fiber forming material and the core liquid must be the same; hence, it is necessary to operate oscillator 65, 65' in exact synchronization.

Specifically, the isopropyl myristate core liquid is supplied at a constant mean flow rate of 3.2 grams per minute; simultaneously, the pressure on the isopropyl myristate is uniformly varied by the aforementioned action of pressure varying means 40 in which oscillator 65 operates at a frequency of about 750 cycles/minute.

At the same time the isopropyl myristate is being supplied in the above-described manner to hollow tube 32, the cuproammonium cellulose solution is supplied to inlet 34 at a constant mean flow rate of about 6 grams (4.6 mls) per minute. The pressure on the cuproammonium cellulose solution is uniformly varied by pressure varying means 80 in which oscillator 65' operates at a frequency of 750 cycles/minute. Oscillators 65 and 65' are in phase and are exactly synchronized. The extrudate exiting the spinneret comprises a wall of the cuproammonium cellulose solution in which is contained the core liquid isopropyl myristate. The extruded material is allowed to fall into a coagulating bath, after which it is regenerated, rinsed, dried, and collected. The coagulating, regenerating, rinsing, drying and collecting steps are carried out as described in Example I.

The fiber produced by the process of this Example II is shown in longitudinal section in FIG. 1. The fiber has a substantially uniform wall thickness of approximately 11 microns. The fiber has a maximum outside diameter, $D_1$, of about 240 microns and a minimum outside diameter, $D_2$, of about 175 microns. Hollow fibers produced by the above-described process of Example II are semipermeable, have a substantially uniform wall thickness, have a non-uniform cross-sectional area, have substantially constant repeat distances, and are useful in a variety of permeability separatory devices. In particular, such fibers are useful as semipermeable hollow fiber membranes for artificial kidney dialyzers. In the fiber of Example II, which is made by regularly varying the pressure applied to the core liquid and the fiber forming material, the number of points of minimum outside diameter would correspond to the number of points of maximum outside diameter. Thus the total number of points of maximum outside diameter and minimum outside diameter may range from about 2/meter to about 400/meter, and preferably from about 10/meter to about 100/meter.

It will be recognized that uniform wall thickness, non-uniform cross-sectional area hollow fibers having random repeat distances can be made by the process of Example II if the pressure applied to the core material and the fiber forming material is varied on a random but in phase and exactly synchronized basis. In such random fibers, the total number of points of maximum outside diameter and minimum outside diameter may range up to four hundred/meter or even more.

MODIFICATIONS

Various modifications may be made in practicing the methods of the present invention. Electronic oscillators 65, 65' may be operated in order to vary the pressure on the core liquid and on the fiber forming material, respectively, at frequencies in the range of from about 50 cycles/minute to about 10,000 cycles/minute, preferably at frequencies ranging from about 500 cycles/minute to about 5000 cycles/minute.

The size of the fiber may be varied by varying the dimensions of the spinneret; by varying the distance through which the extrudate falls after exiting the spinneret and before it reaches its coagulating bath or is otherwise set or gelled; by varying the relative flow rate of the core liquid and/or the fiber forming material; and (as indicated above) by varying the frequency with which the pressure on the core fluid or fiber forming material is changed.

Hollow fibers may be made in a wide range of maximum outside diameters and minimum outside diameters. Hollow fibers particularly useful in permeability separatory devices such as blood dialyzers may have maximum outside diameters ranging from about 20 microns to several hundred or even a thousand microns; preferably, the maximum outside diameters of such fibers range from about 150 microns to about 300 microns. Such hollow fibers may have minimum outside diameters ranging from about 0.9 to about 0.25 times the maximum outside diameter and preferably from about 0.8 to about 0.3 times the maximum outside diameter.

In the case of hollow fibers having a substantially uniform wall thickness, the wall thickness may range from 2 microns to about 80 microns. Wall thicknesses in the range of 2 microns to about 20 microns are even more preferred.

In the case of hollow fibers which have non-uniform wall thicknesses, the mean wall thickness may be in the 8 micron to 80 micron range, and preferably in the 8 micron to 20 micron range. The ratio of the minimum wall thickness to the maximum wall thickness, $t_{min}/t_{max}$, should be in the range of 0.25–0.9, preferably in the range of 0.3–0.8.

We claim:

1. A method for producing a regenerated cellulose hollow fiber having a hollow core extending continuously throughout the length thereof, said fiber having a non-uniform wall thickness and a non-uniform cross-sectional area, said method comprising
   (a) providing a tube-in-orifice spinneret comprising a housing having a chamber communicating with an outer surface thereof and a hollow tube having a continuous lumen extending the length thereof secured within said chamber, the walls of said chamber and the outer surface of said tube defining an annular space through which a fiber forming material may be extruded;
   (b) supplying to said chamber a fiber forming material selected from the group consisting of cuprammonium cellulose solution and viscose cellulose solution;
   (c) extruding said fiber forming material through said annular space to form a hollow core extrudate;
   (d) supplying a fluid at a constant mean flow rate to the lumen of said hollow tube while simultaneously varying the pressure on said supplied fluid;
   (e) removing from the exit of said spinneret said extrudate with said fluid contained in the hollow core thereof; and
   (f) converting said fiber forming material to fiber form.

2. A method according to claim 1 wherein the instantaneous pressure on said supplied fluid has a peak value of about three times the mean pressure and a minimum value of about one-third of the mean pressure.

3. A method according to claim 1 wherein the pressure on said supplied fluid is varied on a regular basis.

4. A method according to claim 1 wherein the pressure on said supplied fluid is varied on a random basis.

5. A method according to claim 1 wherein the pressure on said supplied fluid is varied at a frequency within the range of about 50 cycles/minute to about 10,000 cycles/minute.

6. A method according to claim 1 wherein the pressure on said supplied fluid is varied at a frequency within the range of about 500 cycles/minute to about 5,000 cycles/minute.

7. A method according to any one of claims 1 and 2 through 6 inclusive wherein said fiber forming material is cuprammonium cellulose solution.

8. A method according to any one of claims 1 and 2 through 6 inclusive wherein said fiber forming material is cuprammonium cellulose and said supplied fluid is isopropyl myristate.

9. A method according to any one of claims 1 and 2 through 6 inclusive wherein said fiber forming material is viscose cellulose solution.

10. A method for producing a cuproammonium regenerated cellulose hollow fiber having a hollow core extending continuously throughout the length thereof, said fiber having a non-uniform wall thickness and a non-uniform cross-sectional area, said method comprising
    (a) providing a tube-in-orifice spinneret comprising a housing having a chamber communicating with an outer surface thereof and a hollow tube having a continuous lumen extending the length thereof secured within said chamber, the walls of said chamber and the outer surface of said tube defining an annular space through which a fiber forming material may be extruded;
    (b) supplying a cuproammonium cellulose solution to said chamber;
    (c) extruding said cuproammonium cellulose solution through said annular space to form a hollow core extrudate;
    (d) supplying isopropyl myristate at a constant mean flow rate to the lumen of said hollow tube while simultaneously varying the pressure on said supplied fluid, said pressure having a peak value of about 3 times the mean pressure and a minimum pressure of about ⅓ of the mean pressure;
    (e) removing from the exit of said spinneret said extrudate with said fluid contained in the hollow core thereof; and
    (f) converting said cuproammonium cellulose solution to fiber form.

11. A method according to claim 10 wherein the conversion of the extruded cuproammonium cellulose solution to fiber form is achieved by coagulating said extrudate, regenerating said coagulated extrudate, and rinsing said coagulated and regenerated extrudate.

* * * * *